United States Patent Office 2,792,196
Patented May 14, 1957

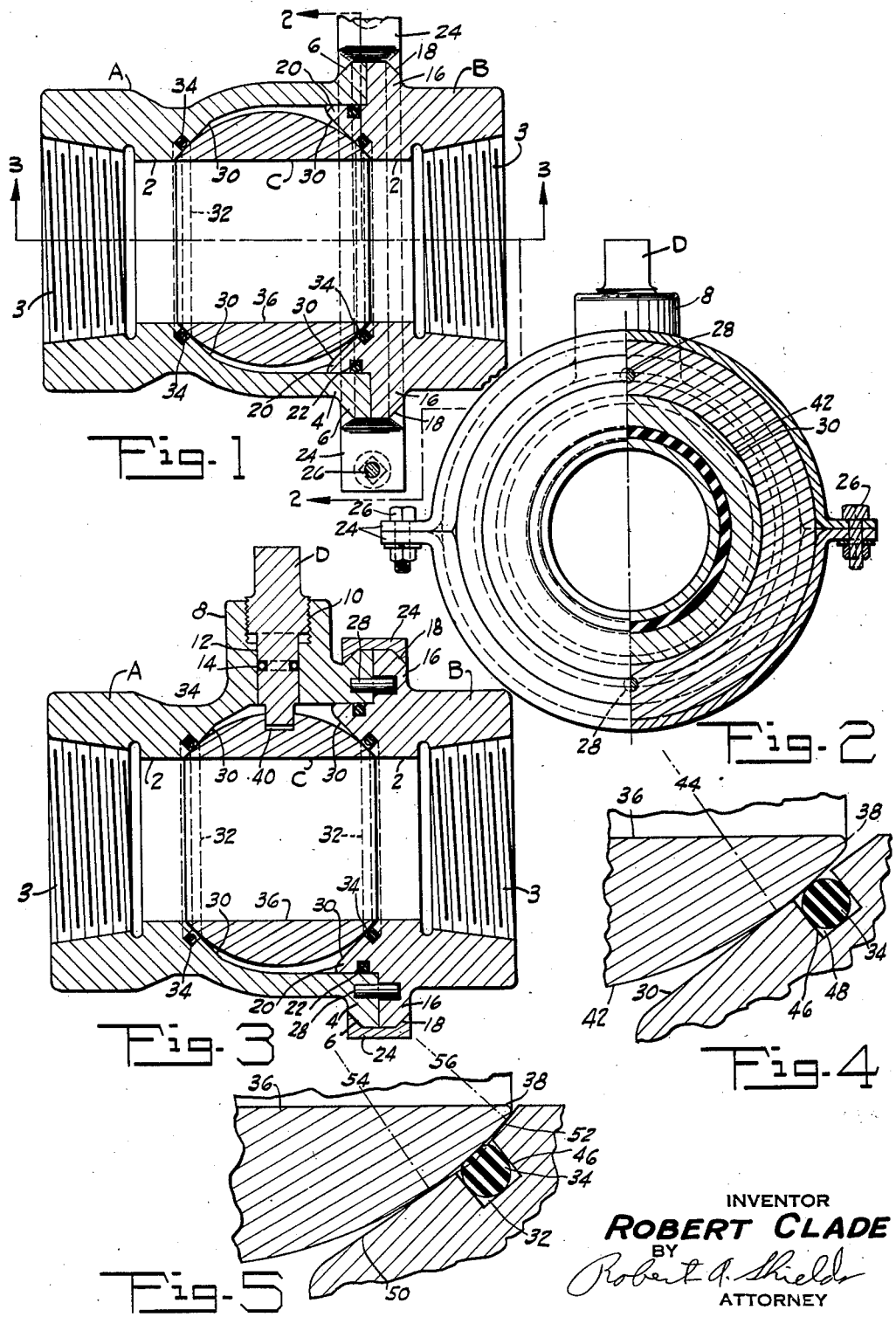

2,792,196

SPHERICAL PLUG VALVE

Robert Clade, Detroit, Mich., assignor, by mesne assignments, to ACF Industries, Incorporated, a corporation of New Jersey Application June 28, 1951, Serial No. 234,080

9 Claims. (Cl. 251—172)

This invention relates to valves in general, and in particular to spherical plug valves having resilient seals.

Valves of the spherical plug type have heretofore been constructed with the body seats conforming to the spherical plug or ball seat. This resulted in large areas or planes of contact requiring very close clearances between the plug and body. Attempts to place sealing means to prevent leakage past the seats has required extremely complicated arrangements to retain the sealing means in position. Also, most of these valves have been incapable of controlling leakage in both directions and had to be placed in the pipe line in a certain position and were wholly unsuitable for pipe lines where direction of flow reversed. It is an object therefore of the present invention to provide a spherical plug valve capable of sealing in either direction of flow.

A further object of the invention is the provision of a plug valve of the spherical type provided with conical body seats cooperating with the spherical plug seats to form an annular line contact.

A further object of the invention is the provision of a valve of the spherical plug type having converging body and plug seats and in which resilient means is provided, pressure urged toward the convergence of the seats.

A yet further object of the invention is the provision of a plug valve of the spherical plug type in which the plug and body seats diverge and are spaced apart adjacent the flow passages in order to prevent pinching of a resilient sealing means inserted in the seat adjacent the flow passage.

These and other objects of the invention will be apparent to persons skilled in the art from a study of the following description and accompanying drawings, in which Fig. 1 is a sectional view taken substantially on the center plane of the valve;

Fig. 2 is a partial end view and partial sectional view taken substantially on line 2—2 of Fig. 1;

Fig. 3 is a sectional view taken substantially on line 3—3 of Fig. 1;

Fig. 4 is an enlarged partial sectional view showing the relation of the plug and body seats with respect to each other and the resilient sealing means; and Fig. 5 is a sectional view similar to Fig. 4, but disclosing a slight modification of the body seats.

Referring now to the drawings in detail, it will be seen that the valve body is formed in two parts, A and B, adapted to inclose the spherical plug C rotated within the body by stem D. The body part A is of general cup shape with a flow passage 2 extending therethrough, one end of this flow passage being threaded, as at 3, to receive suitable piping or other connecting means. It is obvious, of course, that flanged or sweat type connections may be substituted for the screw connections. The edge of the cup member opposite the pipe connecting end is formed with an outwardly directed flange 4, having its one edge bevelled, as at 6. The part A is also formed with a boss 8 through which extends an opening for reception of the stem D. As shown, this stem has the upper end formed to receive a wrench or other operating means and the intermediate portion threaded, as at 10, so as to engage similar threads in the body boss 8. By this means the stem is prevented from being blown out of the body by line pressure. The inner portion of stem D is reduced in diameter, as at 12, and notched to receive, as at 14, a resilient seal, preferably in the form of an O-ring. The body part B, like the part A, is formed with a flow passage 2 and pipe connecting portion 3, which may be either of the threaded, sweat or flanged type. This part is also formed with an outwardly directed flange 16 bevelled, as at 18; inwardly of the flange 16 an upstanding projection 20 is formed adapted to engage closely within the open cup of part A. This projection 20 is grooved to receive an O-ring or other seal 22 which is adapted to seal the line of contact between body part A and projection 20 of part B. Parts A and B as shown are clamped together by half rings 24, bolted together as at 26, and provided with tapered surfaces corresponding to the tapers 6 and 18 of body parts A and B respectively. In order to prevent relative rotation between parts A and B, pins 28 may be forced into holes in part B and engaged in sockets of part B. It is, of course, obvious that a bolted connection between parts A and B may be substituted for the quick clamp type of connection shown.

Body parts A and B adjacent flow passages 2 are formed with bevelled seats 30 which as shown are formed at an angle of 45 degrees to the axis of the flow passages. In other words, these seats are portions of conical members having their apices on the axis of the flow passage, and since these conical sections have a common base, they diverge inwardly or converge outwardly with respect to the transverse or stem axis of the body and will tend to hold the spherical plug centered. Grooves 32 are formed in the conical body seats and adapted to receive a resilient seal such as O-ring 34. The shape and location of this groove and the resilient seal will be later referred to in detail.

The plug is of spherical or ball shape and is pierced to provide a flow passage 36 which can be brought into alignment with flow passages 2 or turned at substantially right angles thereto to cut off the flow of material through flow passages 2. By piercing the ball or spherical plug as shown the passage 36 in effect cuts off spherical segments from opposite sides of the sphere or ball, and these points of cutting off are preferably rounded, as at 38, to prevent sharp edges which may be readily broken or chipped during manufacture. These rounded edges and adjacent portions of the spherical plug may be properly referred to as the rotating edges of flow passage 36. As clearly shown, the ball or spherical plug is notched, as at 40, to receive the lower end of stem D, so that the plug may be rotated within the body.

As clearly shown in Fig. 4, the plug seating surface 42 engages the body seating surface 30 at their point of tangency which will be the base of a cone having its apex coinciding with the center of the spherical plug. One element of this cone is indicated, as at 44, and will, of course, be perpendicular to the body seat 30 at the point of tangency between plug seat 42 and body seat 30. The side walls of groove 32 are formed parallel to the line 44 and the entire groove is preferably located outwardly of line 44, that is, between the annulus of contact between plug and body and the adjacent body flow passage. In this way the plug and body seats diverge toward the flow passage and any fluid tending to leak between body and plug will force the resilient seal into the clearance space and toward the annulus of contact. Thus it will be seen that irrespective of the direction of application of pressure the valve is sealed against leakage. It would also be seen that due to the diverging seats the rotating edges of the plug flow passage can not contact and pinch the resilient seal, this being due to the fact that the annulus of contact is always inwardly of the resilient member and the rotating edges are always spaced from and can not contact the resilient seal. The width of grooves 32 are preferably slightly less than the diameter of the resilient seal or O-ring member 34, so that this member will closely engage the walls 46, and when pressed into position will force air from the corners 48, thus creating a vacuum effectively holding the O-ring in its groove. Valves constructed in accordance with the above teaching have been tested and disclose no discernible wear or damage to the sealing means after upwards of twenty thousand operations.

In some instances it may be desirable to use a single O-ring seal on the body seats or to give two annular areas of contact at each flow passage of the body. This can be done, as shown in Fig. 5, by breaking the body seat 30 up into two seating surfaces; namely, an inner seat 50 and an outer seat 52 converging preferably toward the center of the sealing groove 32, as is clearly indicated. In other words, these surfaces 50 and 52 are portions of conical members having spaced apices on the axis of the flow passage with the apex corresponding to seat surface 50 being more remote from the plug C than the apex corresponding to seat surface 52. The surface 50 is perpendicular to line 54, while the surface 52 is perpendicular to the line 56, both of which correspond to the line 44 of Fig. 4. Thus it will be seen that annular areas of contact are provided between the valve plug and body and that the seats diverge toward the resilient seal, so that any leakage, regardless of its direction, will tend to urge the seal toward an area of contact. While a single arrangement such as described can be used, it is preferable that both seats be so modified, thus forming a pair of annular rings of contact adjacent each body passage with an annular ring of resilient sealing material intermediate the annular rings of metallic contact. In this way leakage is prevented by a double resilient seal, regardless of the direction in which the pressure is acting.

While the invention has been described more or less in detail, with specific reference to the figures, it will be obvious to persons skilled in the art that modifications other than those shown and described may be made, and all such modifications and rearrangements of parts are contemplated as will fall within the scope of the following claims defining my invention.

What is claimed is:

1. In a spherical plug valve the combination of a valve body, a body flow passage for the movement of matter through the body, a plug rotatable in said body and having a flow passage therethrough adapted to be aligned with the body flow passages to form a through passage, said plug being movable between an open and closed position to control flow of matter through the valve, a truncated substantially conical body seat surface integrally formed in said body adjacent the body flow passage, a substantially spherical seat surface formed on said plug and contacting said body seat surface to form a ring of contact surrounding the body flow passage, said seat surfaces diverging inwardly and outwardly with respect to the body from said annular ring of contact to provide clearance space therebetween, a groove formed in said body seat surface and located to one side of said annular ring of contact, and resilient means in said groove and urged into said clearance space and toward said ring of contact by pressure of matter in the adjacent body flow passage.

2. In a spherical plug valve the combination of a valve body, spaced apart flow passages formed in said body, an outwardly converging truncated substantially conical body seat surface integrally formed in said body adjacent the inner end of each body flow passage, a plug mounted in said body between the flow passages and itself being formed with a plug flow passage adapted to be aligned with the body flow passages to form a through passage, means to rotate said plug in said body to control flow of matter through the valve, a substantially spherical seat surface formed on said plug and contacting said body seat surfaces to form spaced rings of contact surrounding the inner end of each body flow passage, said body and plug seat surfaces diverging from each ring of contact toward the adjacent flow passage to provide clearance between the seat surfaces adjacent the flow passage.

3. In a spherical plug valve the combination of a valve body, spaced apart flow passages formed in said body, an outwardly converging truncated substantially conical body seat surface integrally formed in said body adjacent the inner end of each body flow passage, a plug mounted in said body between the flow passages and itself being formed with a plug flow passage, means to rotate said plug in said body to control flow of matter through the valve, a substantially spherical seat surface formed on said plug and contacting said body seat surfaces to form spaced rings of contact surrounding the inner end of each body flow passage, said body and plug seat surfaces diverging outwardly from each ring of contact toward the adjacent flow passage to provide clearance between the seat surfaces adjacent the flow passage, and resilient sealing means carried adjacent each said ring of contact and movable into the clearance and toward the ring of contact by pressure of matter in the adjacent flow passages.

4. In a spherical plug valve the combination of a valve body, spaced apart flow passages formed in said body, a pair of outwardly converging truncated substantially conical body seat surfaces integrally formed in said body adjacent the inner end of each body flow passage, the seat surface of each pair of seat surfaces being formed with spaced apices, a plug mounted in said body between the flow passages and itself being formed with a plug flow passage, means to rotate said plug in said body to control the flow of matter through the valve, a substantially spherical seat surface formed on said plug and contacting each of said seat surfaces in spaced apart pairs of parallel rings of contact adjacent each body flow passage.

5. In a spherical plug valve the combination of a valve body, spaced apart flow passages formed in said body, a pair of outwardly converging truncated substantially conical body seat surfaces integrally formed in said body adjacent the inner end of each body flow passage, the seat surface of each pair of seat surfaces being formed with spaced apices, a plug mounted in said body between the flow passages and itself being formed with a plug flow passage, means to rotate said plug in said body to control the flow of matter through the valve, a substantially spherical seat surface formed on said plug and contacting each of said seat surfaces in spaced apart pairs of parallel rings of contact adjacent each body flow passage, and resilient means carried by said body and contacting said plug seat surface in an annulus of contact intermediate the rings of contact comprising each pair of rings of contact.

6. In a spherical plug valve the combination of a valve body, spaced apart flow passages formed in said body, a pair of outwardly converging truncated substantially conical body seat surfaces integrally formed in said body adjacent the inner end of one of said flow passages, and each converging toward a separate apex, a plug mounted in said body between the flow passages and formed with a plug flow passage, means to rotate said plug in said body to control flow of matter through the valve, a substantially spherical seat surface formed on said plug and contacting each of said body seat surfaces in spaced apart substantially parallel rings of contact, said seat surfaces diverging between said rings of contact to provide clearance space.

7. In a spherical plug valve the combination of a valve body, spaced apart flow passages formed in said body, a pair of outwardly converging truncated substantially conical body seat surfaces integrally formed in said body adjacent the inner end of one of said flow passages, and each converging toward a separate apex, a plug mounted in said body between the flow passages and formed with a plug flow passage, means to rotate said plug in said body to control flow of matter through the valve, a substantially spherical seat surface formed on said plug and contacting each of said body seat surfaces in spaced apart substantially parallel rings of contact, said seat surfaces diverging between said rings of contact to provide clearance space, and resilient means carried by said body and contacting said plug seat in an annulus of contact substantially parallel to said first named rings of contact, said resilient means being urged into the clearance space and toward a first named ring of contact by pressure of matter in the adjacent flow passage and irrespective of direction of flow in the passage.

8. In a spherical plug valve the combination of a valve body, a body flow passage for the movement of matter through the valve, a plug rotatable in said body and itself having a flow passage formed therein, means to rotate said plug between an open and a closed position controlling flow of matter through the valve, a truncated substantially conical seat surface integrally formed in said body adjacent the body flow passage, a substantially spherical seat surface formed on said plug and contacting said body seat surface to form a ring of contact surrounding the body flow passage, said seat surfaces diverging from said ring of contact to provide clearance space between the plug seat surface adjacent the end of said plug flow passage and said body seat surface, and a resilient means carried by said body between said ring of contact and said body flow passage, said resilient means contacting said plug seat surfaces and movable toward said ring of contact by pressure of matter in said body flow passage.

9. In a valve body of a spherical plug valve, a valve seat comprising, a pair of truncated substantially conical seat surfaces integrally formed in the valve body surrounding a flow passage through the body, each seat surface converging toward a separate apex and each adapted to contact a substantially spherical plug in a ring of tangency whereby substantially parallel rings of tangency are established, an annular groove interrupting said conical seat surfaces between the rings of tangency, and resilient means positioned in said groove projecting outwardly therefrom sufficiently as to contact a spherical plug.

References Cited in the file of this patent

UNITED STATES PATENTS

| | | |
|---|---|---|
| 1,331,025 | Riggin | Feb. 17, 1920 |
| 1,672,394 | Sargent | June 5, 1928 |
| 1,973,418 | Sibley | Sept. 11, 1934 |
| 2,083,584 | Wineman | June 15, 1937 |
| 2,333,424 | Humphreys | Nov. 2, 1943 |
| 2,401,856 | Brock | June 11, 1946 |
| 2,516,947 | Blevans | Aug. 1, 1950 |
| 2,558,260 | Maky | June 26, 1951 |
| 2,616,512 | Coon | Nov. 4, 1952 |

FOREIGN PATENTS

| | | |
|---|---|---|
| 895,194 | France | Jan. 17, 1945 |